United States Patent [19]

Tiemann

[11] Patent Number: 4,712,978
[45] Date of Patent: Dec. 15, 1987

[54] HELICOPTER BLADE AND THE LIKE STAND-OFF AND FOLDING DEVICE

[76] Inventor: James P. Tiemann, 100 Manor Rd., Huntington, N.Y. 11743

[21] Appl. No.: 936,708

[22] Filed: Dec. 1, 1986

[51] Int. Cl.$^4$ .................... B64C 11/28; B64C 27/50
[52] U.S. Cl. ........................................ 416/1; 416/143
[58] Field of Search ................ 416/143, 142, 1, 62, 416/146 R

[56] References Cited

U.S. PATENT DOCUMENTS

| | | | |
|---|---|---|---|
| 2,110,443 | 3/1938 | Larsen et al. | 416/143 X |
| 2,220,109 | 11/1940 | Larsen | 416/143 |
| 2,405,777 | 8/1946 | Buivid | 416/143 |
| 2,447,118 | 8/1948 | Gluhareff | 416/143 |
| 3,101,785 | 8/1963 | Leoni | 416/143 |
| 3,133,715 | 5/1964 | Grunfelder | 416/143 X |
| 3,135,333 | 6/1964 | Cruz et al. | 416/143 |
| 3,158,203 | 11/1964 | Grunfelder | 416/143 |
| 4,252,504 | 2/1981 | Covington et al. | 416/143 |
| 4,268,222 | 5/1981 | Bernard | 416/143 X |

*Primary Examiner*—Everette A. Powell, Jr.
*Attorney, Agent, or Firm*—Richard L. Miller

[57] ABSTRACT

The instant invention provide a helicopter blade and the like stand-off and folding device that permits a helicopter blades to be folded up to positions close to the tail of the aircraft during inclement weather, storage, transport, or maintenance, etcetera. During a fold or unfold a one-to-one correspondence between the blades and the main rotor head is maintained and critical adjustments of the rotor blade assembly are not disturbed.

6 Claims, 7 Drawing Figures

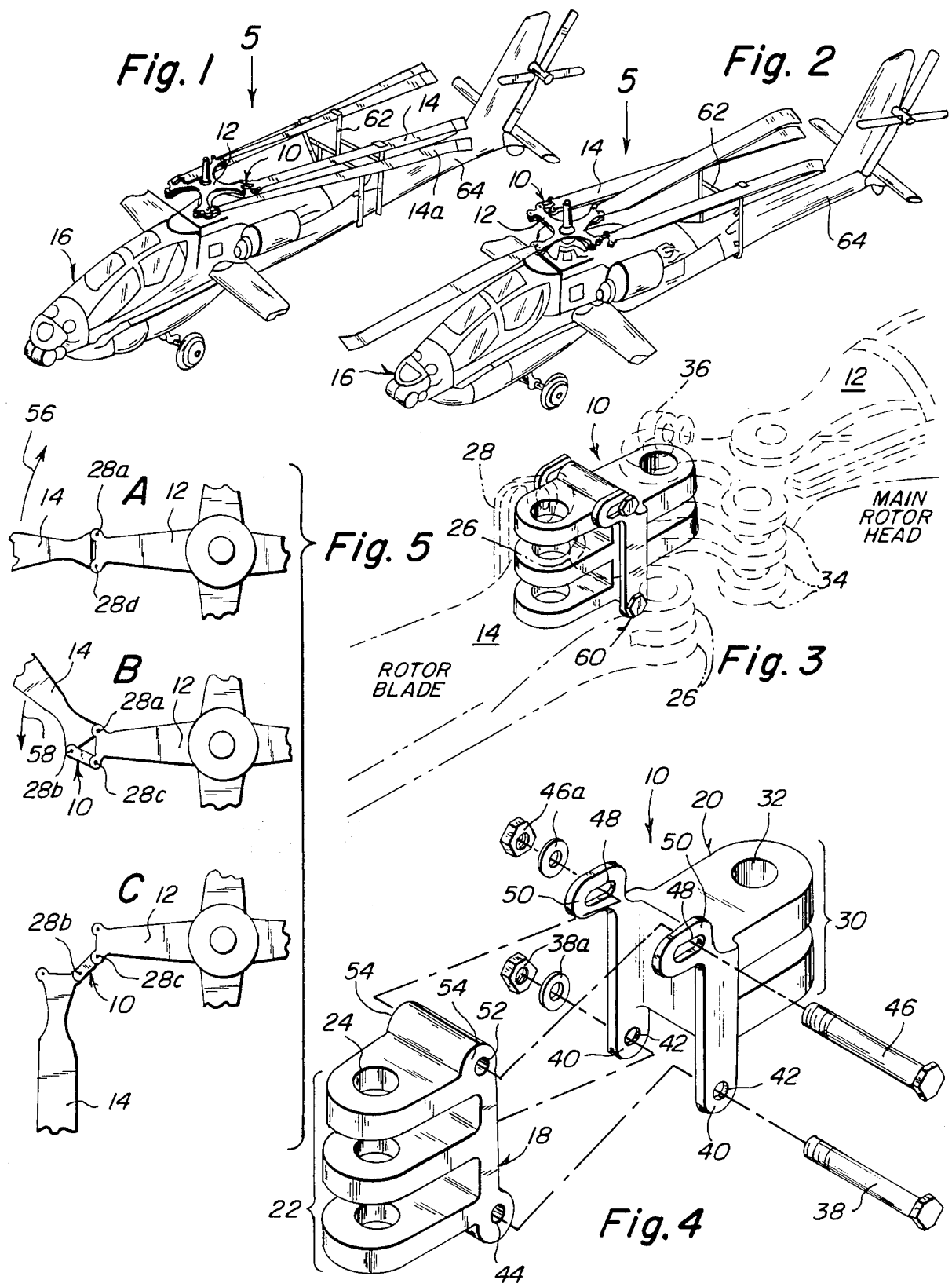

HELICOPTER BLADE AND THE LIKE STAND-OFF AND FOLDING DEVICE

BACKGROUND OF THE INVENTION

The instant invention relates generally to helicopter blades; methods, systems, and devices which permit the lifting blades of the main rotor to be folded.

There are many occasions when a helicopter is not aloft when it is desirable to fold the main rotor, to mention just a couple the following are to be noted:

1. The helicopter is to be parked at an airfield or on an aircraft carrier during high wind conditions such as a hurricane etcetera and is much more subject to damage with its blades extended.

2. The helicopter is to be stored at a location where space is at a premium, such as an aircraft carrier, maintenance facility, or in a transport vehicle.

Numerous helicopter related patents have been provided in the prior art that are adapted to permit the lifting rotor blades to be folded. For example, U.S. Pat. Nos. 1,673,233 to La Cierva, 2,110,443 to Larsen at al, 2,110,563, to Thaon, 2,405,777 to Buivid, 2,424,769 to Page, and 2,549,886 to Buivid all are illustrative of such prior art. While these units may be suitable for the particular purpose to which they address, they would not be as suitable for the purpose of the present invention as hereafter described.

SUMMARY OF THE INVENTION

A primary object of the present invention is to provide a helicopter blade and the like stand-off and folding device that will overcome the shortcomings of the prior art devices.

Another object is to provide a helicopter blade and the like stand-off and folding device that can be used with lifting rotors regardless of how many blades the rotor may contain.

An additional object is to provide a helicopter blade and the like stand-off and folding device that will permit the blades of the lifting rotor to be folded out of the way with out ever totally separating each individual blade from the rotor mast thus maintaining a one-to-one correspondence between each blade and the mechanism in the rotor head to which each blade is attached. Maintaining this one-to-one correspondence between individual rotor blades and the main rotor mast is extremely important because if this relationship were not maintained the blade assembly would certainly have to be re-balanced before a craft could be considered to be air worthy after a blade unfold procedure were performed.

A further object is to provide a helicopter blade and the like stand-off and folding device that will permit the main rotor blades to be folded with out altering, changing, or disassembling any of the mechanism of the main rotor mast. This also is an extremely important feature because the main rotor mast cooperate with the individual blades when controlling the flight characteristics of a helicopter. While the aircraft is aloft any improper adjustments will degrade the performance of the craft. Since this system does not require any adjustments, or disconnection of linkages etc. in the main mast rotor assembly as do most other systems, unfolding of the blade assembly does not require that the craft need to be placed through extensive flight testing or that the the blade be re-balanced.

A further object is to provide a helicopter blade and the like stand-off and folding device that in principle is simple and easy to use.

A still further object is to provide a helicopter blade and the like stand-off and folding device that is relatively economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of a helicopter with all of the main rotor blades in a fold position utilizing the instant invention.

FIG. 2 is another perspective view of a similar helicopter to that of FIG. 1, with all of the main rotor blades in a folded position, except for the blades in the forward and aft positions, also utilizing the instant invention.

FIG. 3 is a perspective view of the rotor blade stand-off attached to the associated mating parts of a typical helicopter blade shown in phantom.

FIG. 4 is a exploded perspective view of the blade stand-off per se.

FIGS. 5A-C are simplified diagrammatic top plan views with parts broken away illustrating the steps of how the rotor blade stand-off is used to accomplish a blade fold.

DETAILED DESCRIPTION OF THE PREFERRED EMBODIMENTS

Turning now descriptively to the drawings, in which like reference characters denote like elements throughout the several views, FIGS. 1, 2 and 3 shows the stand-off device 10 interposed between the main rotor head 12, and a typical rotor blade 14 of helicopter 16.

The stand-off device as best seen in FIG. 4, has two major sub-components, a rotor blade interface component 18, and a main rotor interface component 20. The rotor blade interface component 18, has a trifurcated set of ears 22, with a coaxial hole 24 through all of the ears 22 which may be mated with a set of bifurcated ears 26 of a typical rotor blade 14 and rotatively attached together with a blade retainer pin 28. The main rotor interface component 20, similarly has a bifurcated set of ears 30, with a coaxial hole 32 through both of the ears 30 which may be mated with a set of trifurcated ears 34 of a typical main rotor head 12 and similarly rotatively attached together with a blade retainer pin 36 (see FIG. 3).

The two major sub-components, that is the rotor blade interface component 18, and the main rotor interface component 20, are like wise pivotally attached by a pivot bolt 38 which is passed through holes 42 in pivot ears 40 of the main rotor interface component 20, and also through a through bore 44 of the rotor blade interface component 18, so as to form a hinge like attachment joint 60.

This hinge like attachment joint permits the major sub-components 18 and 20 to pivot with respect to each other.

A second bolt 46, which is passed through elongated holes 48 in adjustment ears 50 of the main rotor interface component 20, and also through another through bore 52 of the rotor blade interface component 18, serves as a locking device and a part of a mechanism to permit only limited rotation between the two major sub-components 18 and 20.

These bolts 38 and 46 are typically retained in place by respective nut and washer assemblies 38a and 46a, and when bolt 46 and nut assembly 46a is torqued sufficiently tight adjustment ears 50 are caused to press against the surfaces 54 to such a degree so as to prevent an pivotal movement between sub-components 18 and 20.

In operative use when it is desired to fold a blade 14 of the main rotor 12, a retainer pin 28d is removed as best seen in FIG. 5-A, and the blade 14 is rotated about the remaining pin 28a in the direction of arrow 56 with respect to the rotor 12 which is held stationary, until the blade has been pivoted to the position shown in FIG. 5-B.

The stand-off device 10 is now interposed between the main rotor head 12, and a typical rotor blade 14 and two retainer pins 28b and 28c are inserted in the mating sets of aligned bifurcated and trifurcated ears of this assembly as illustrated in FIG. 5-B.

Next retaining pin 28a is removed from this assembly and blade 14 is rotated in the direction of arrow 58 with respect to the rotor 12 which is still held stationary, until the blade has been pivoted to the approximate position shown in FIG. 5-C, which is typically a folded position of the folded blades in FIGS. 1 and 2 when viewed in the direction of arrows 5.

Because in some situations depending on which blades are being folded and how many blades a particular helicopter rotor may have the forward positioned blades may interfere with the rearward positioned blades. It is to account for this interfering situation that sub-component 18, may be pivoted about pivot bolt 38 at the hinge like attachment joint 60.

A typical example of where a forward blade 14a has been pivoted about this pivot bolt 38 so as to clear blade 14 just above it is seen in FIG. 1. It is to be noted that in this case the axis of bolt 38, is skewed with respect to the flight operating axis of rotation of the main rotor head 12.

When the blades are folded they may be rested in a cradle 62 designed to received them mounted toward the tail 64 of the helicopter.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A helicopter blade and the like stand-off and folding device comprising:
   a. a rotor blade interface component having attachment means to a rotor blade of said helicopter;
   b. a main rotor interface component having attachment means to a main rotor of said helicopter; and
   c. means for joining said rotor blade interface component together with said main rotor interface component, whereby when said stand-off and folding device is attached between said rotor blade and said main rotor, said blade may be pivoted about said main rotor to a folded position.

2. A helicopter blade and the like stand-off and folding device as recited in claim 1, wherein said attachment means to said rotor blade of said helicopter is a first set of ears which mate with a set of ears which are an integral part of said rotor blade and have a hole through which a retaining pin can be inserted.

3. A helicopter blade and the like stand-off and folding device as recited in claim 1, wherein said attachment means to said main rotor of said helicopter is a second set of ears which mate with a set of ears which are an integral part of said main rotor and have a hole through which a retaining pin can be inserted.

4. A helicopter blade and the like stand-off and folding device as recited in claim 1, wherein said means for joining said rotor blade interface component together with said main rotor interface component, is a pivotal hinge joint having means for limiting the degrees through which said joint can pivot, an means for locking said joint from pivoting.

5. A method for folding a helicopter blade assembly, which comprises:
   a. removing a first retaining pin from said helicopter blade assembly;
   b. pivoting a rotor blade in a first direction about a second retaining pin;
   c. inserting a stand-off and folding device between said rotor blade and a main rotor of said helicopter;
   d. installing a third retaining pin through said stand-off and folding device, and said main rotor of said helicopter;
   e. installing a fourth retaining pin through said stand-off and folding device, and said rotor blade of said helicopter;
   f. removing said second retaining pin from said helicopter blade assembly; and
   g. pivoting said rotor blade in a second direction about said third and said fourth retaining pins in said helicopter blade assembly to a folded position.

6. A method for folding a helicopter blade assembly as recited in claim 5, which further includes the additional step of pivoting said rotor blade of said helicopter about an axis skewed to a flight operating axis of rotation of said helicopter blade assembly.

* * * * *